2 Sheets—Sheet 1.
S. WHITLOCK.
Mechanical-Movement.
No. 197,438. Patented Nov. 20, 1877.
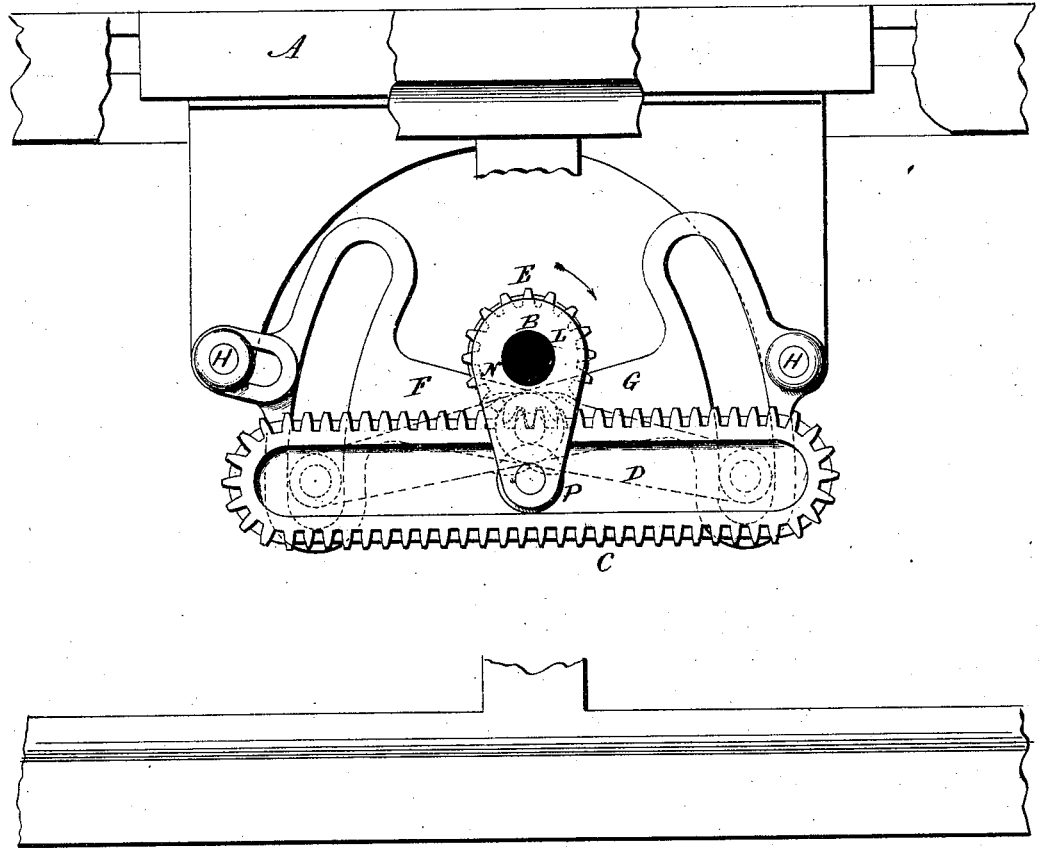
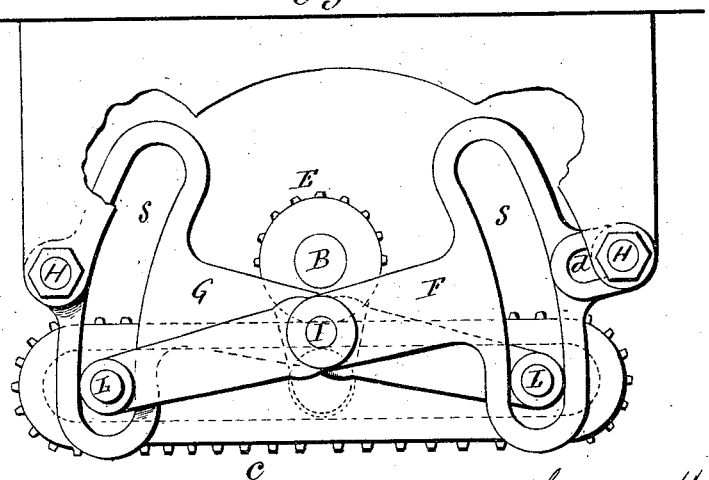
Witnesses:
Sturgis Whitlock
Inventor
By Atty.

2 Sheets—Sheet 2.

S. WHITLOCK.
Mechanical-Movement.

No. 197,438. Patented Nov. 20, 1877.

Witnesses.

Sturgis Whitlock
Inventor
By Atty

UNITED STATES PATENT OFFICE.

STURGES WHITLOCK, OF BIRMINGHAM, CONNECTICUT.

IMPROVEMENT IN MECHANICAL MOVEMENTS.

Specification forming part of Letters Patent No. 197,438, dated November 20, 1877; application filed October 26, 1877.

*To all whom it may concern:*

Be it known that I, STURGES WHITLOCK, of Birmingham, in the county of New Haven and State of Connecticut, have invented a new Mechanical Movement; and I do hereby declare the following, when taken in connection with the accompanying drawings, and the letters of reference marked thereon, to be a full, clear, and exact description of the same, and which said drawings constitute part of this specification, and represent, in—

Figure 3:
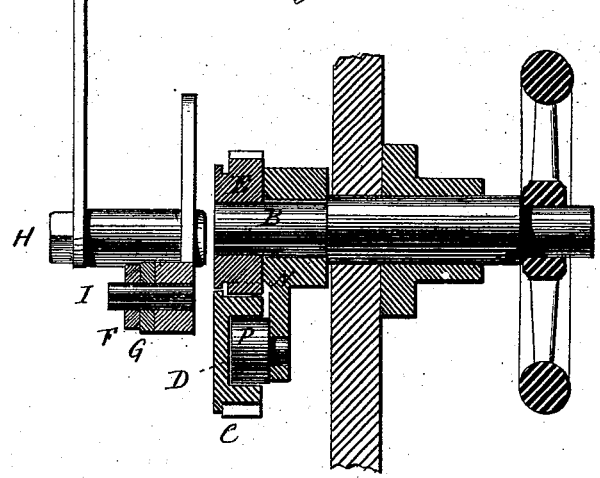
Figure 4:
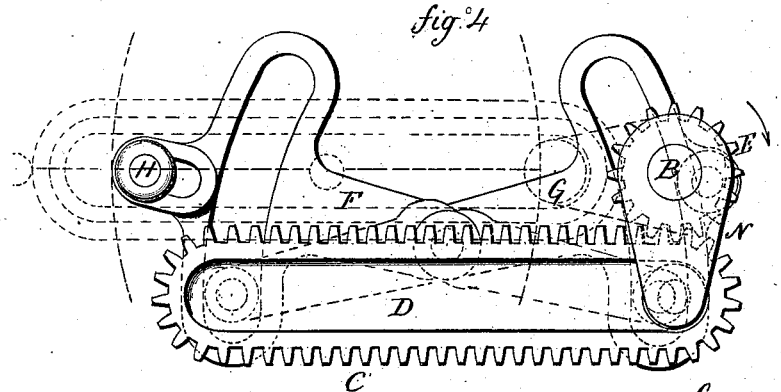
Figure 5:
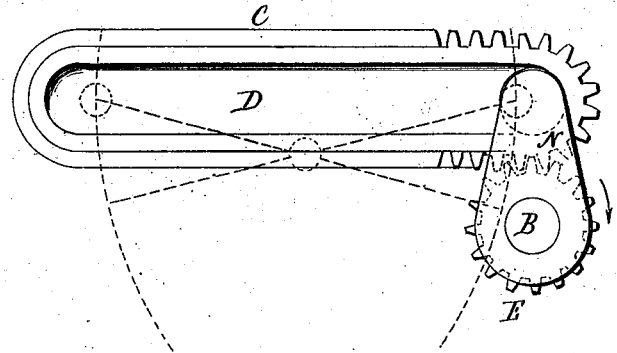

Figure 1, Sheet 1, a side view; Fig. 2, the reverse; Fig. 3, Sheet 2, central section; Figs. 4 and 5, diagrams illustrating the operation.

This invention relates to a device for converting rotary into reciprocating motion, or vice versa; and it consists in an endless rack supported by mechanism which will at all times or in different positions maintain the same parallelism of the rack, combined with a pinion having fixed centers and working in said rack, and a loose crank the axis of which is in line with the axis of said pinion, the crank-pin working in a groove so as to hold the said rack always in working contact with the said pinion, as more fully hereinafter described.

For convenience of illustration, the invention is shown and described as applied to impart a reciprocating movement to a platen, A, the power imparted through a revolving driving-shaft, B. C is an endless rack, its two sides parallel and ends semicircular, forming a continuous toothed rack. Longitudinally in the center of this rack is a groove or recess, D, the outline of this recess corresponding to the pitch-line of the rack, preferably of smaller area, so that the recess forms the inside of the rack, as seen in Fig. 3. On the driving-shaft B a pinion, E, is firmly fixed, the teeth of the pinion corresponding to the teeth of the rack, so as to work freely therein. The rack C is hung in the same plane as the pinion, in the following manner: F G are two levers, one end of each hung to the platen A, or thing to be moved, as at H H. These bearings H H should be in a line drawn through the center of the shaft B, and parallel to the longitudinal center-line of the rack C. These levers cross each other, and are attached together by a central pivot, I, so that both move together and in a plane parallel with that of the rack and pinion. The other or free end of the levers are hung to the rack by pivots or trunnions L, the said pivots L in the longitudinal central line; hence, as the rack is moved vertically, the said levers will hold the rack at all times parallel to their own pivot-line. A slot, S, is formed in the levers, through which the trunnions move, and to allow the slight longitudinal movement of the levers at their fixed points H necessary for them to pass above and below the longitudinal central line, a slot, d, is formed in one of the levers F at the bearing H, as seen in Figs. 1 and 2. This slot may, however, be at either of the pivots of said levers.

In order that the rack may in all positions be held in working contact with the pinion E, a crank, N, is loosely hung upon the shaft B, with its crank-pin or friction-roll P thereon lying in the recess D of the rack, the diameter of the crank-pin P preferably about equal to the width of the recess; but it is only necessary to bear upon the point of the rack in radial line from the center of the pinion. This completes the construction.

The operation is as follows: Starting, say, from the position in Fig. 1, the pinion E revolving in the direction denoted by the arrow, the rack will be moved in a horizontal line until the end of the recess D in the rack strikes the crank-pin P, as in Fig. 4. The pinion, continuing its revolution, will force the rack still in the same direction; but the crank N, now holding the end of the rack, will cause it to rise, as denoted in broken lines, Fig. 4, the pinion working around the semicircular end of the rack until the rack has been carried above the pinion, as seen in Fig. 5. The pinion, continuing the revolution, now works on the under side of the rack, carrying it back in a horizontal line until the other end is reached. Then, in a like manner, the rack will be carried below, and, so continuing, will pass back and forth over and under the pinion, the levers G F always maintaining the parallelism of the rack, and the crank holding it at all times in the proper relative position to the pinion.

The connection of the rack, through the levers F G, to the platen A or thing to be moved, communicates to such platen a corresponding reciprocating movement.

If it be desired to reverse this operation— that is, convert reciprocating into rotary motion—the power is applied to impart to the rack and levers such reciprocating motion, and, by reverse action, the pinion will be caused to revolve. In such case a fly-wheel on the shaft B would be desirable to aid in carrying the rack over the dead-centers.

While I prefer the parallel mechanism which I have described to support the endless rack, it will be evident, by the foregoing description, that other mechanism may be substituted for the levers which will support the rack and maintain its parallelism substantially as do the said levers.

Instead of the parallel mechanism, the rack itself may be made permanent, and the pinion-bearings arranged to move vertically, so as to rise and fall around the ends of the rack.

I therefore do not wish to be understood as confining myself to the use of the special parallel mechanism described; but What I do claim as my invention, and desire to secure by Letters Patent, is—

1. The combination of the endless rack C, the pinion E, and crank N, with a parallel mechanism to support the said rack, substantially as described.

2. The combination of an endless reciprocating rack, the driving-pinion working therein, and the crank serving as a guide to maintain the proper relative position of the said rack and pinion, substantially as described.

3. The combination of an endless reciprocating rack, the driving-pinion working therein, and the crank serving as a guide to maintain the proper relative position of the said rack and pinion, and a parallel mechanism to support the said rack, substantially as described.

STURGES WHITLOCK.

Witnesses:
   JOHN E. EARLE,
   H. A. KITSON.